Aug. 8, 1950 W. F. TAYLOR 2,517,608
COMBINATION WOODWORKING LATHE AND DRILL PRESS BEARING
Filed July 3, 1944 4 Sheets-Sheet 1

INVENTOR.
Wm. F. TAYLOR.
BY Lester B. Clark.
ATTORNEY.

Aug. 8, 1950     W. F. TAYLOR     2,517,608
COMBINATION WOODWORKING LATHE AND DRILL PRESS BEARING
Filed July 3, 1944     4 Sheets-Sheet 2
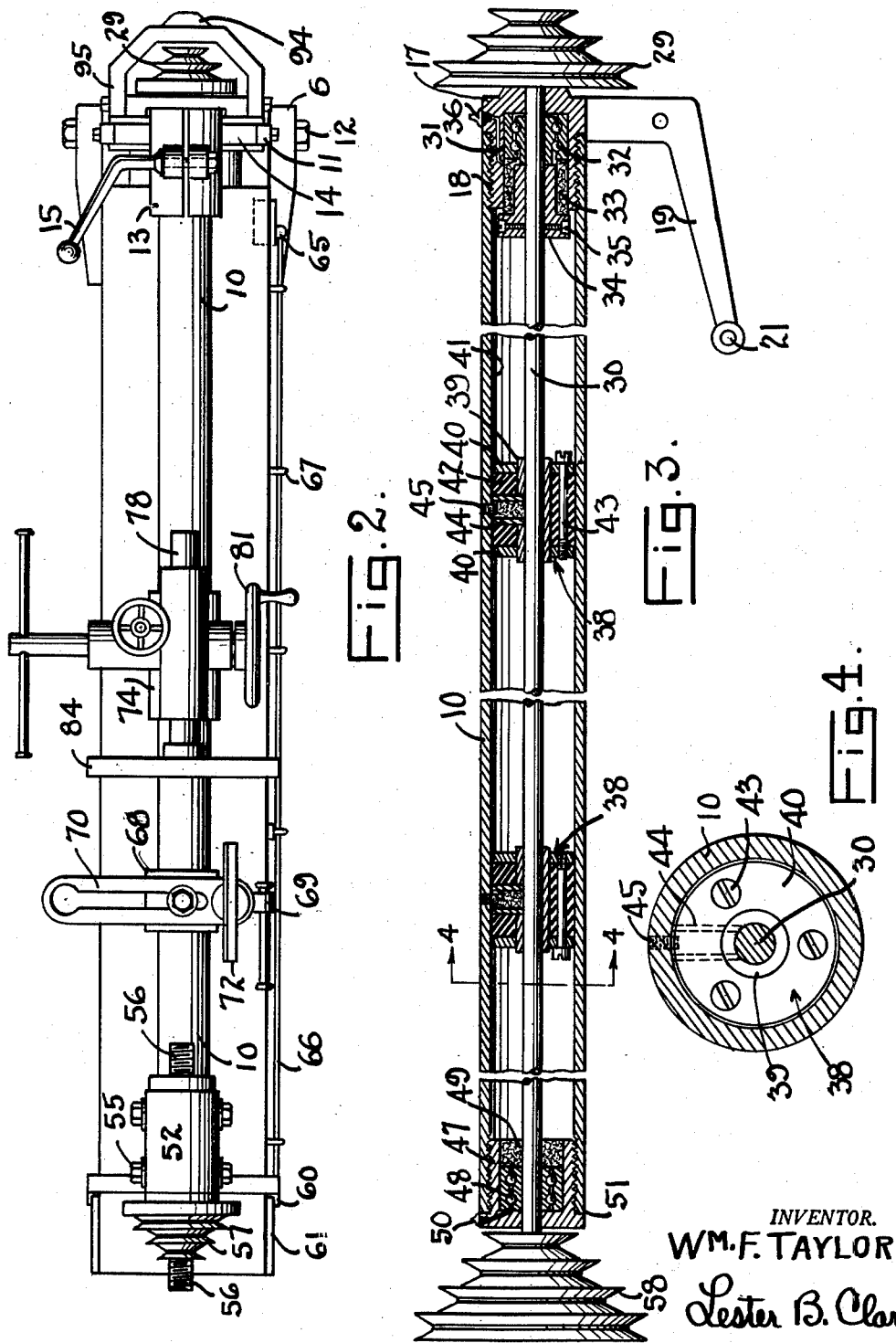
INVENTOR.
WM. F. TAYLOR
Lester B. Clark
ATTORNEY.

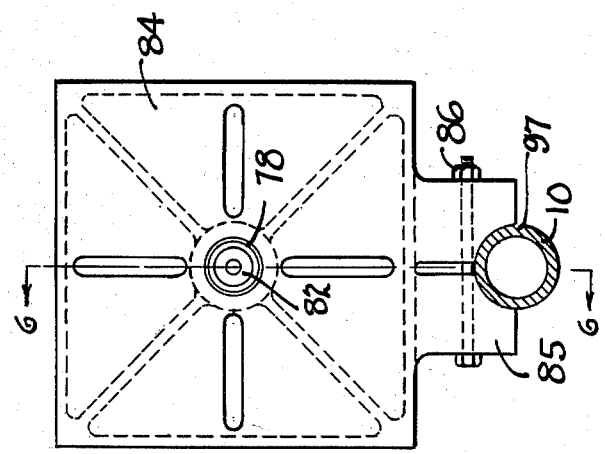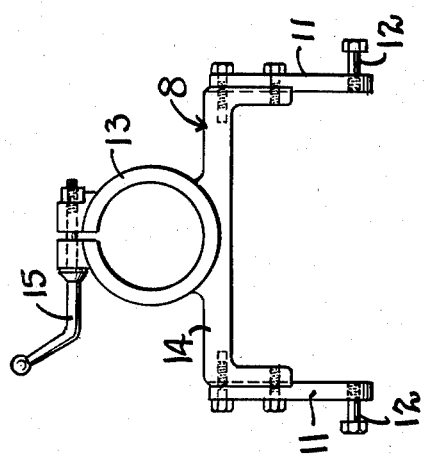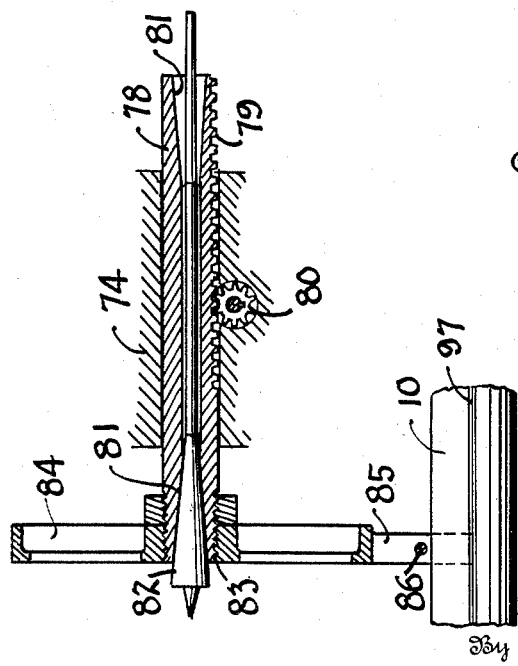

Aug. 8, 1950 W. F. TAYLOR 2,517,608
COMBINATION WOODWORKING LATHE AND DRILL PRESS BEARING
Filed July 3, 1944 4 Sheets-Sheet 4

INVENTOR.
WM. F. TAYLOR
Lester B. Clark
ATTORNEY.

Patented Aug. 8, 1950

2,517,608

UNITED STATES PATENT OFFICE 2,517,608

COMBINATION WOODWORKING LATHE AND DRILL PRESS BEARING

William F. Taylor, Tulsa, Okla.

Application July 3, 1944, Serial No. 543,396

1 Claim. (Cl. 308—26)

The invention relates to a combination lathe and drill press apparatus which is adapted to perform all of the functions of both machines.

The present invention is in the nature of an improvement over the general construction shown in my prior Patent 2,226,029 for a Lathe-Drill Press, granted December 24, 1940, and involves simplifications and improvements which result in a much better machine and which can be constructed and operated more economically.

It is one of the objects of the invention to provide a combination lathe and drill press wherein the lathe bed serves as a support for the motor at one end and the head stock at the other end so that one counterbalances the other in manipulating the bed.

Another object of the invention is to provide a combination lathe and drill press wherein the lathe bed serves as a support and housing for the drive shaft from the motor to the head stock.

Still another object of the invention is to provide a combination lathe and drill press wherein the equipment which is movable is generally balanced so as to permit convenient manipulation thereof while providing an equipment which will operate satisfactorily both as a lathe and as a drill press.

Another object of the invention is to provide a combination tail stock and drill press table which is reversible and which can be utilized with the machine for either purpose.

Still another object of the invention is to provide a motor driven lathe-drill press wherein the motor serves as a counterbalance for the lathe bed and head stock.

Other and further objects of the invention will be readily apparent when the following description is considered in connection with the accompaying drawings wherein:

Fig. 2 is a top plan view looking down on the apparatus of Fig. 1.

Fig. 3 is a vertical sectional view through the tubular lathe bed and illustrating the manner of mounting the drive shaft therein.

Fig. 4 is a section taken on the line 4—4 of Fig. 3 to illustrate the arrangement of one of the shaft bearings positioned in the tubular lathe bed.

Fig. 5 is a front face view of the tail stock and table.

Fig. 6 is a vertical sectional view taken on the line 6—6 of Fig. 5.

Fig 7. is an end elevation of the mounting for pivoting the lathe bed.

Figure 8:
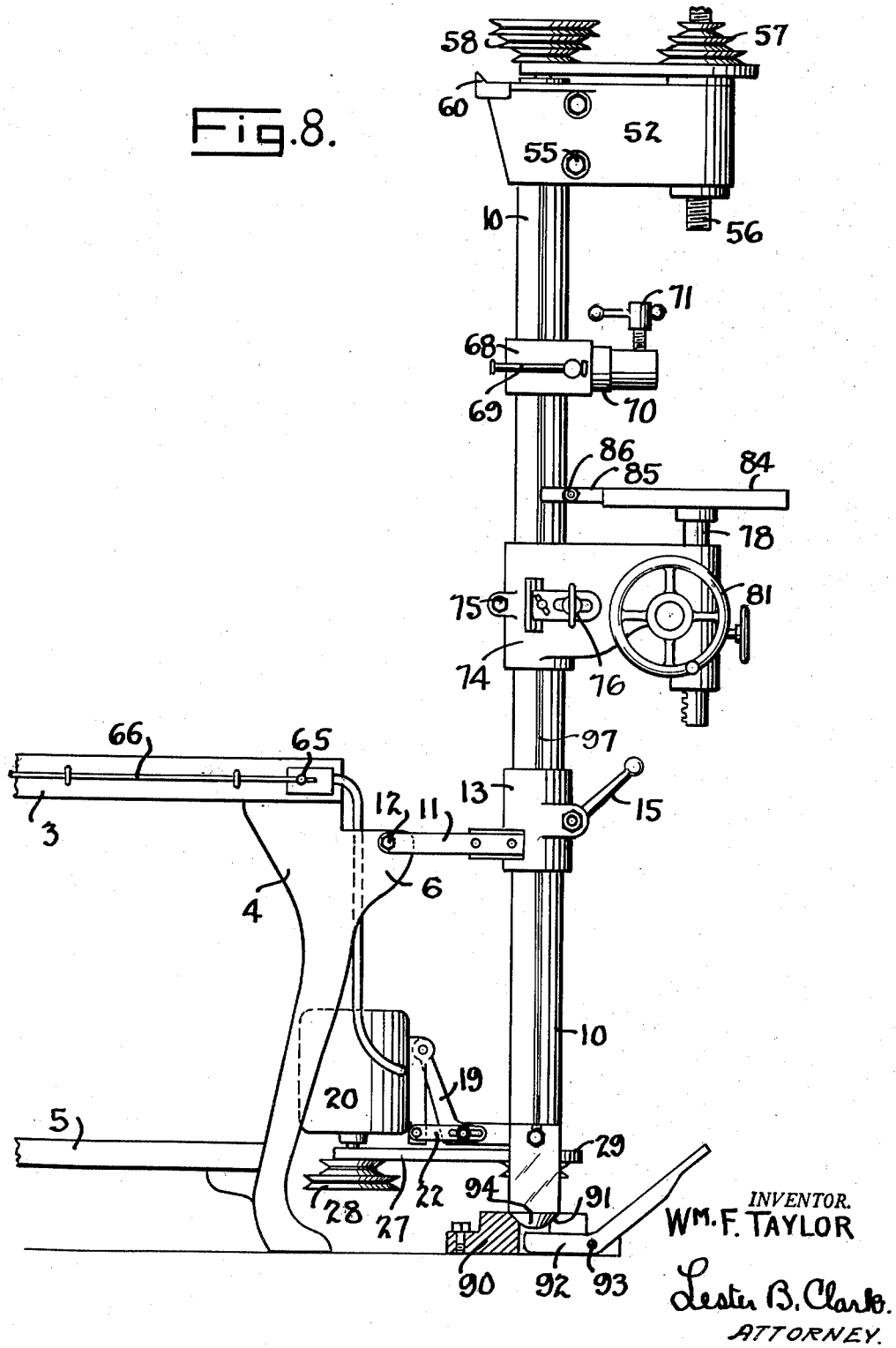

Fig. 8 is a side elevation with the equipment tilted to a vertical position for use as a drill press.

Figure 1:
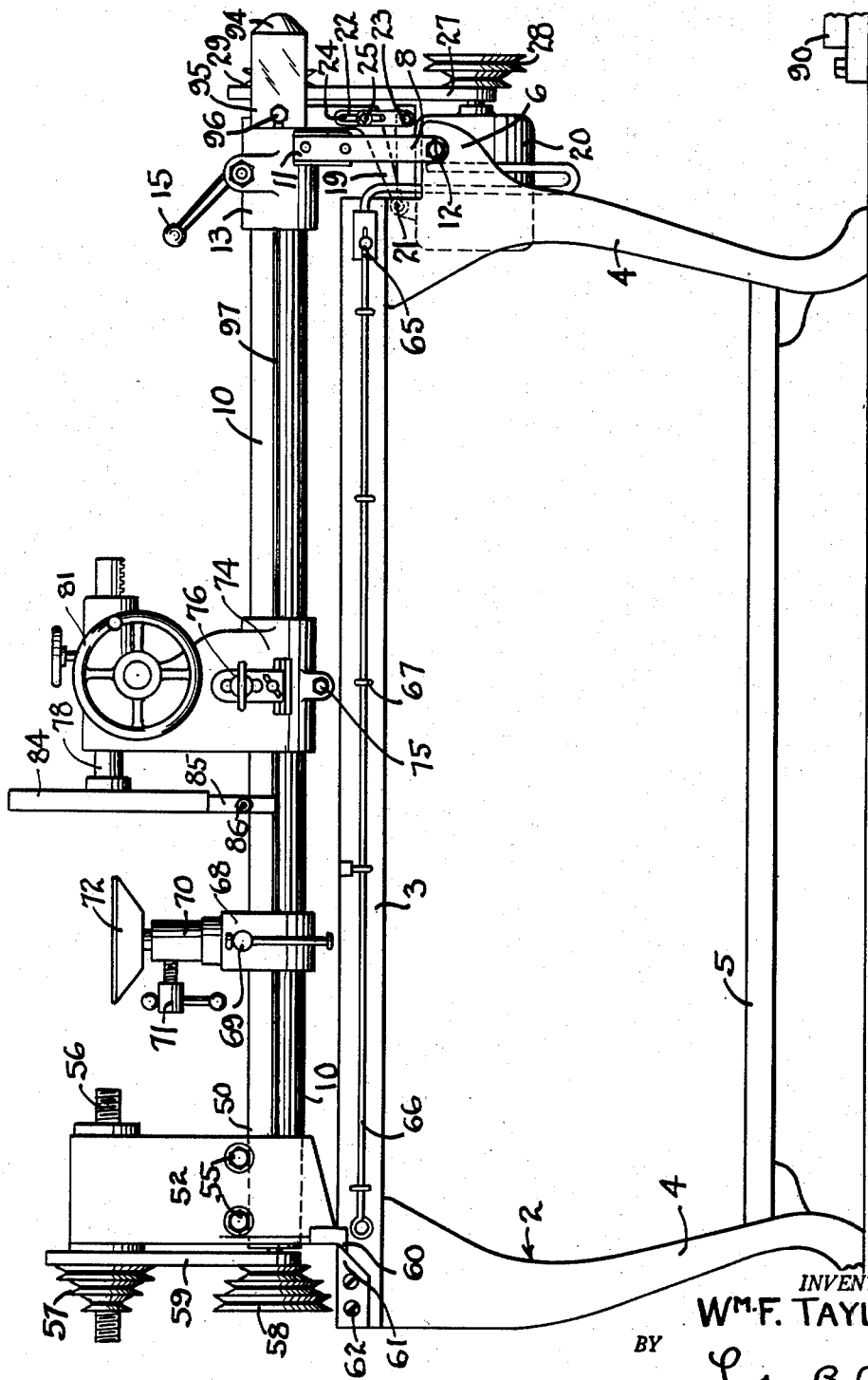
Fig. 1 is a side elevation of the apparatus in position for use as a lathe.

In Fig. 1 a bench 2 has been illustrated as having a top 3, legs 4 and bracing 5. The two legs at the right hand end are provided with lugs or brackets 6 which project therefrom and act as a support for the pivot yoke 8 which is arranged to support the lathe bed 10.

This pivot yoke is seen in end elevation in Fig. 7 and includes the two legs 11, each of which carries a pivot bolt 12 to be fastened to the lugs 6. The sleeve 13 is formed on the cross brace 14 and is of the split type so that it may be adjusted by means of a clamping bolt 15 in order to grip or release the tubular lathe bed 10.

As seen in Fig. 3 the lathe bed 10 is a hollow tubular member having an end plug 17 which is arranged to be threaded at 18 into the end of the tube. This lug is formed with the motor support arms 19 thereon so that a motor 20 may be pivoted at 21 to the arms. In order to adjust the position of the motor relative to the lathe bed 10 the links 22 have been provided and are connected to the bar 23 fixed to the motor and have a slot 24 which is adjustable on a bolt 25 carried by the arms 19. This adjustment permits tightening or loosening of the belt 27 which passes over the sheave 28 of the motor and the sheave 29 on the drive shaft 30 which is mounted for rotation in the end plug 17.

The end plug 17 carries a bearing 31 so as to rotatably support the shaft 30. This bearing is of special construction in that it has the anti-frictional bearings 32 which are enclosed by a resilient packing 33 held in position by a gland 34 affixed to the shaft by screws 35. A lubricant fitting 36 is arranged to supply lubricant to the bearing.

As seen in the drawing the shaft 30 will be of considerable length so as to extend through the lathe bed 10 and the intermediate bearings 38 are therefore provided. These bearings are of special construction to be anchored inside of the tube and include a bearing sleeve 39 having the end plates 40 in the form of annular discs slipped over the sleeve to fit slidably against the sleeve and against the inner periphery 41 of the tube 10. Disposed between these plates, however, is an annular ring 42 of resilient material which is adapted to be compressed by the bolts 43 screwed into one plate and having the head thereof engaging the other plate. It seems obvious that this bearing can be slipped into the housing to the desired position with the lubricant tube 44 aligned with the lubricant port 45 and then the bolts 43 screwed home so as to pull the two plates together and expand the resilient ring 42 so as to frictionally engage the inside of the housing. In this manner the bearing is adapted to absorb a certain amount of vibration and will be suitably anchored inside of the tube. Two such bearings are shown and then the head stock end bearing 47 serves to support the other end of the shaft. This bearing includes the anti-friction portion 48 and the packing 49 to confine lubricant injected from the fitting 50.

The left end 51 of the bed tube serves to support the head stock 52 which is clamped in position by the cross bolts 55 best seen in Fig. 1. This head stock carries the head stock arbor 56 which is rotatably mounted therein in a suitable bearing structure which supports the head stock pulley 57. These pulleys are arranged to be driven by the sheaves 58 mounted on the head stock end of the shaft 30 and the power is transmitted by a belt 59.

In order to clamp the lathe bed in lathe operating position as seen in Fig. 1 a foot 60 is shown as fixed to the head stock housing 52 which foot is arranged to engage under the plate 61 fixed by the screws 62 on the bench 2. This foot is slipped under the plate by releasing the clamp 13 and sliding the bed tube 10 to the left as seen in Fig. 1. The clamp 13 is then again tightened by the lock arm and bolt 15 so that the bed is securely clamped in the position of Fig. 1.

A switch 65 for control of the motor is shown on the right hand end of the bench 2 in Fig. 1, but inasmuch as the operator is usually toward the left hand end of the bench when using the machine as a lathe, a switch rod 66 has been mounted in the eyes 67 on the side of the bench.

The lathe bed 10 serves a dual purpose, that of supporting and carrying the bearings for the drive shaft 30 and also for supporting the tool rest support sleeve 68. This sleeve is arranged to be tightened or loosened relative to the tubular bed by means of a clamp bolt 69. This tool rest sleeve carries the tool rest slide 70 which in turn carries the locking bolt 71 in order to clamp the tool rest 72 in position.

The lathe bed 10 also supports the tail stock sleeve 74 which can be clamped in desired position by the bolts 75. A centering adjustment device 76 is carried by the sleeve and the upper portion of the tail stock is arranged to support the tail stock quill 78. This construction is best seen in section in Fig. 6 where the tail stock quill is shown as having a rack 79 thereon operable by the pinion 80 and the hand wheel 81 so as to adjust the quill to and fro. The quill, it will be observed, has a morse taper area 81 at each end thereof so that the quill may be reversed and either end may be used as desired. A morse dead centre 82 is shown as disposed in the left hand end of the quill. The quill is threaded at 83 to receive the table 84 which is arranged to receive various types of blocks, chucks or supports for various pieces of equipment or the work. The table is shown as having a pair of extensions 85 thereon which are arranged to partially embrace the lathe bed 10 and to be slidably adjusted, never clamped, thereto by means of a bolt 86.

Fig. 8 shows the machine tilted from the horizontal lathe position of Fig. 1 to the vertical drill press position by merely releasing the clamp bolt 15, sliding assembly to the right, then tightening the bolt 15 and tilting the bed 10. The particular advantage of the arrangement of the motor 20 on one end of the lathe bed and the head stock on the other end of the bed is now apparent because each counterbalances the other in order to permit the ready tilting of the bed from vertical to horizontal position. To accomplish this tilting operation it is only necessary to release the bolt 15 and the clamp sleeve 13 so that the tube 10 may slide therein. When such release is accomplished then the entire bed including the head stock can be moved to the right as seen in Fig. 1. This moves the foot 60 from beneath the plate 61. The bed is then moved to the right a sufficient distance so that when locked by 15 and then tilted up, the end of the bed will barely clear the socket 90 which is disposed on the floor as best seen in Fig. 1. This socket has a cup 91 therein so as to engage the ball 94 carried by the yoke 95 fixed on the end of the bed by the bolts 96. A lever 92 pivoted at 93 is provided to lift the ball 94 out of the cup to permit tilting back to lathe position. After sliding the assembly to the right, before the tilting action, the clamp 13 should be tightened and the bed tilted and then the clamp released so as to allow the tube to slide down a short distance into the cup 91 so as to properly center the entire piece of equipment. The clamp can be again tightened and the tools and various parts are now locked in position for use as a drill press. The arbor 56 is arranged to receive morse taper tools or threaded chucks or other equipment and the tool rest sleeve 68 may or may not be used. The side of the tube or lathe bed 10 may have a groove 97 therein as best seen in Figs. 1 and 8 so as to hold the various equipment in a vertical plane regardless of whether the bed is being used as a lathe or drill press.

Broadly the invention contemplates a combination lathe and drill press wherein the parts are balanced and the motor and the head stock tend to balance each other.

What is claimed is:

In a combination lathe and drill press a bed comprising a tubular member, a drive shaft therein, bearings for said shaft mounted in said member, each of said bearings including a shaft support portion, a pair of end support plates fitting said portion and the inside of said tubular member, a resilient member disposed between said plates, and means to draw said plates together to force said member against the inside of said tube to anchor said bearing.

WILLIAM F. TAYLOR.

REFERENCES CITED

The following references are of record in the file of this patent:

UNITED STATES PATENTS

| Number | Name | Date |
|---|---|---|
| 198,211 | Post | Dec. 18, 1877 |
| 354,601 | Hunter | Dec. 21, 1886 |
| 809,594 | Widmer-Abegg | Jan. 9, 1906 |
| 1,167,091 | McGill | Jan. 4, 1916 |
| 1,303,394 | Robbins | May 13, 1919 |
| 2,089,362 | Haas | Aug. 10, 1937 |
| 2,105,009 | Roebuck | Jan. 11, 1938 |
| 2,157,241 | Manning | May 9, 1939 |
| 2,201,477 | Chamberlin | Mar. 21, 1940 |
| 2,200,799 | Miller | May 14, 1940 |
| 2,226,029 | Taylor | Dec. 24, 1940 |
| 2,327,035 | Gray et al. | Aug. 17, 1943 |